United States Patent
Wech

(10) Patent No.: US 10,107,451 B2
(45) Date of Patent: Oct. 23, 2018

(54) FLUID RESERVOIR

(71) Applicant: OIL-RITE CORPORATION, Manitowoc, WI (US)

(72) Inventor: Michael J Wech, Manitowoc, WI (US)

(73) Assignee: Oil-Rite Corporation, Manitowoc, WI (US)

(*) Notice: Subject to any disclaimer, the term of this patent is extended or adjusted under 35 U.S.C. 154(b) by 112 days.

(21) Appl. No.: 14/064,782

(22) Filed: Oct. 28, 2013

(65) Prior Publication Data
US 2015/0114981 A1    Apr. 30, 2015

(51) Int. Cl.
| | | |
|---|---|---|
| B65B 7/28 | (2006.01) |
| F16N 19/00 | (2006.01) |
| B65D 8/00 | (2006.01) |
| B65D 6/28 | (2006.01) |
| F16N 7/00 | (2006.01) |

(52) U.S. Cl.
CPC .............. *F16N 19/003* (2013.01); *B65D 7/34* (2013.01); *B65D 15/08* (2013.01); *B65D 15/10* (2013.01); *B65D 15/16* (2013.01); *F16N 7/00* (2013.01)

(58) Field of Classification Search
CPC .......... B65D 7/34; B65D 15/08; B65D 15/10; B65D 15/16; B65D 55/16; F16N 19/003; F16N 7/00
USPC .... 220/612, 288, 611, 613, 642, 916, 254.2, 220/375; 222/189.06, 630, 397; 137/342, 386; 215/306
See application file for complete search history.

(56) References Cited

U.S. PATENT DOCUMENTS

| | | | | |
|---|---|---|---|---|
| 2,393,584 A | * | 1/1946 | Bennett | H01T 1/10 220/288 |
| 2,477,404 A | * | 7/1949 | Butt, Jr. | B01D 29/055 210/241 |
| 3,631,538 A | | 12/1971 | Kohn | |
| 4,108,327 A | * | 8/1978 | Shonerd et al. | 220/581 |
| 4,147,906 A | | 4/1979 | Levine | |
| 4,404,441 A | | 9/1983 | MacLaren | |
| 4,921,071 A | * | 5/1990 | Lonnborg | B63H 20/002 137/587 |
| 5,042,300 A | | 8/1991 | Benjey et al. | |
| 5,297,939 A | | 3/1994 | Orth et al. | |
| 5,427,268 A | * | 6/1995 | Downing, Jr. | B01J 3/03 220/581 |
| 5,814,780 A | | 9/1998 | Batchelder et al. | |
| 5,961,299 A | | 10/1999 | Gruett et al. | |

(Continued)

OTHER PUBLICATIONS

Oil-Rite Corporation Catalog, Dated 1998, pp. 2 and 3.
Oil-Rite Corporation Catalog, Dated 2006, p. 30.

*Primary Examiner* — J. Gregory Pickett
*Assistant Examiner* — Elizabeth Volz
(74) *Attorney, Agent, or Firm* — Ryan Kromholz & Manion, S.C.

(57) ABSTRACT

A fluid reservoir assembly, for containing a fluid such as a lubricant is disclosed with a first end plate, a body and a second end plate. The body is preferably formed from plastic or glass. The end plates are composed of a molded plastic resin and are sealingly fastened to the body with an adhesive. The reservoir assembly has an inlet and outlet. Depending upon the configuration of the end plates and body, reservoirs of various sizes, capacities and cross-sectional shapes (e.g. circular, rectangular, etc.) can be fabricated without the need for dedicated molds and specialized tooling.

24 Claims, 5 Drawing Sheets

(56) References Cited

U.S. PATENT DOCUMENTS

| | | |
|---|---|---|
| 6,069,331 A | 5/2000 | Utke |
| 6,089,086 A | 7/2000 | Swindler et al. |
| 6,446,506 B1 | 9/2002 | VanZuien |
| 7,550,689 B2 | 6/2009 | Wech et al. |
| 8,322,559 B2 * | 12/2012 | Kuzelka .................. B65D 15/08 220/288 |
| 2009/0120815 A1 * | 5/2009 | Mitchell ............ B65D 51/2821 206/222 |
| 2009/0230079 A1 * | 9/2009 | Smolko .............. B65D 41/0442 215/261 |
| 2010/0270327 A1 * | 10/2010 | Bassett ................. F25D 23/126 222/1 |
| 2012/0000916 A1 * | 1/2012 | Kleber ..................... F16J 12/00 220/590 |

* cited by examiner

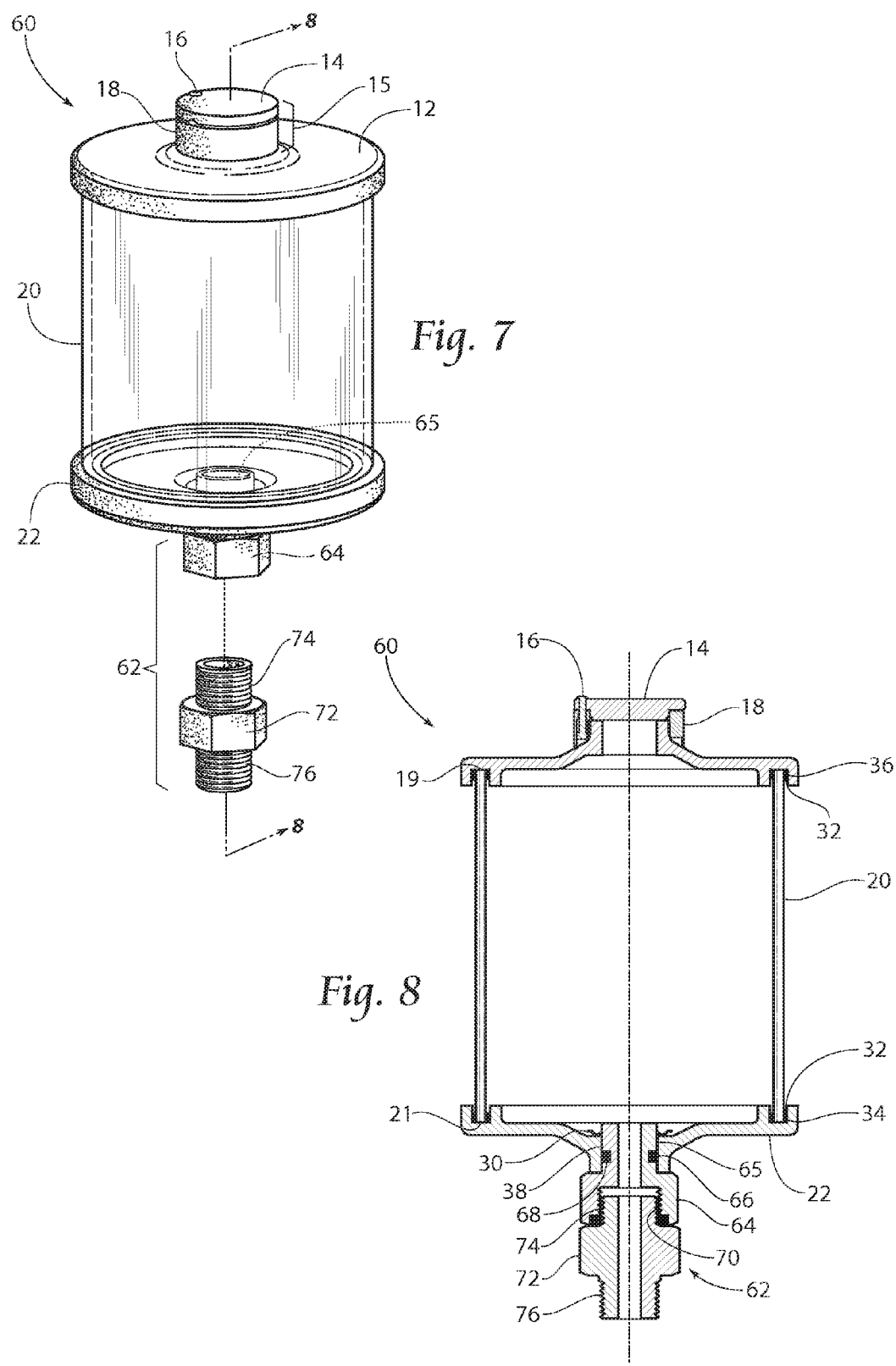

FLUID RESERVOIR

BACKGROUND OF THE INVENTION

The present invention relates to reservoirs used for holding and dispensing fluids, such as lubricants. Reservoirs of various capacities are used to contain and dispense lubricants for lubricating machine tools, machinery, pneumatic tools, conveyors and the like. The size of the reservoir is typically determined by its application or the amount of fluid that is required to be dispensed over a predetermined time period. Reservoirs typically have an inlet for filling the reservoir with fluid and an outlet through which the fluid is dispensed.

At present there are a variety of reservoirs for containing and dispensing fluids, such as lubricants. One common prior art reservoir uses a cylindrical or rectangular container with a screw on top cover. Another uses a cylindrical or rectangular container with a screw on bottom cover. In both instances, the containers may be made from glass or plastic. In the case of plastic containers, they are typically formed by either rotational or blow molding techniques. The contents of these reservoirs may become contaminated if an operator fails to reinstall the cover after filling the reservoir. They also do not allow a manufacturer to inexpensively produce many varying capacities because each size of reservoir container must be formed or molded from a specifically sized and dedicated mold. Furthermore the manufacturing process, whether made from glass or plastic, requires that threads be integrally molded into the container body as well as the removable cover so that the two will threadingly mate and seal.

Another typical prior art reservoir utilizes a top end plate, a bottom end plate, a cylindrical body and a centrally located tie rod to secure the end plates to each end of the cylindrical body. A gasket is typically placed at the junction of the body and each end plate to provide a fluid-tight seal. In the prior art, the end plates are commonly made from stamped sheet steel or cast and machined aluminum. The tie rod passes through an opening in the top end plate, through the body and through a similar opening in the bottom end plate. Fittings or fasteners are threaded onto the ends of the tie rod on the outer surfaces of the end plates so that a fluid tight seal is formed between each end plate, gasket and body. The tie rod that passes through the assembled reservoir alters the capacity of the reservoir and obstructs full visibility there through. This reservoir configuration also does not provide a contamination-proof assembly because the tie rod fittings and/or fasteners can loosen during shipping or over a period of time which is likely to result in reservoir leakage. This common prior art design also has multiple points where elastomeric seals are required to prevent leaks. Over time, seals can also fail thus leading to leaks. As described, this design requires numerous parts and components. Additionally, the variation of reservoir heights is limited to the length of tie rods available.

Prior art reservoirs that require a multitude of parts for assembly have other shortcomings. Some of these parts limit the variety of reservoir capacities, and also add weight, cost, and time to their manufacturing processes. Reducing any extraneous parts and/or capacity limiting parameters would be beneficial and considered an improvement in the art. It is desirable to have a reservoir whose capacity is known and whose interior visibility is not obstructed. It is desirable to have a fluid reservoir that is not subject to fluid contamination and leaks. It is also desirable to have a fluid reservoir that is lightweight yet durable during shipping as well as in use. It is furthermore desirable to have a fluid reservoir that is easy to install, is rotationally adjustable after installation, has a universal outlet fitting and is easy to fill with fluid.

SUMMARY OF THE INVENTION

In one respect, a reservoir for housing fluid is provided. The reservoir includes a body which forms a cavity when enclosed by two end plates. The body has opposed open ends and a wall that defines an interior. For example, the body may be cylindrical in shape or cubical in shape. The body is formed from either plastic or glass. For example, the body may be fabricated from an acrylic plastic, glass, PYREX® brand glass or another suitable material. The end plates that enclose the open ends are molded from plastic, such as polycarbonate, polypropylene or similar resins. In a preferred embodiment, the end plates are substantially identical to one another. The molded end plates are secured to the open ends of the body with an adhesive. The adhesive forms a fluid-tight seal between the mating body and end plate. Thus each end plate is sealingly attached to the body. Preferably, a two-part adhesive is utilized. The adhesive may alternatively be a one-part adhesive or cured with UV light during the assembly process.

In one possible configuration, one of the end plates contains an inlet and the other end plate contains an outlet. Other possible configurations may include a fluid filter which filters out impurities in the liquid as it exits the reservoir and/or a low level switch which can be used to actuate warning devices or shut off a machine receiving the fluid or lubricant to prevent machine damage.

Depending upon the configuration of the end plates and the body, reservoirs of various sizes and capacities can be fabricated without the need for an expensive mold and specialized tooling.

BRIEF DESCRIPTION OF THE DRAWINGS

FIG. 7 is a perspective view of a second embodiment of the reservoir.

FIG. 8 is a front sectional view of a second embodiment of the reservoir along line 8-8 of FIG. 7.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
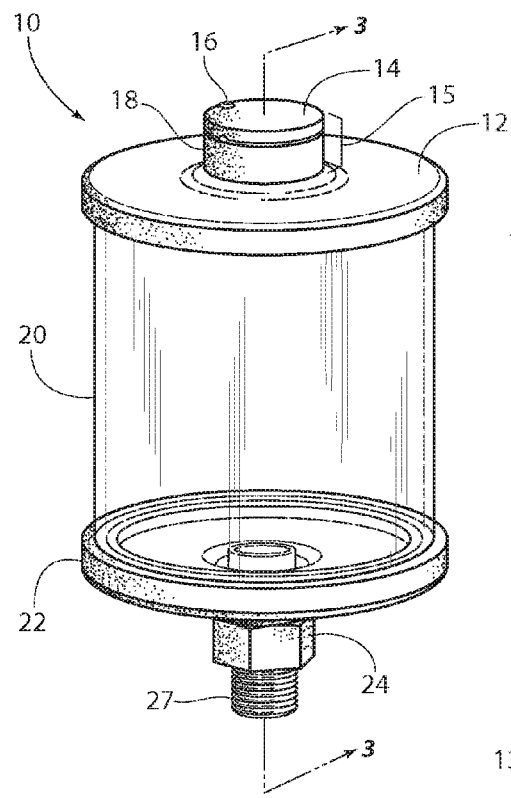
FIG. 1 is a perspective view of a first embodiment of the reservoir.
Figure 2:
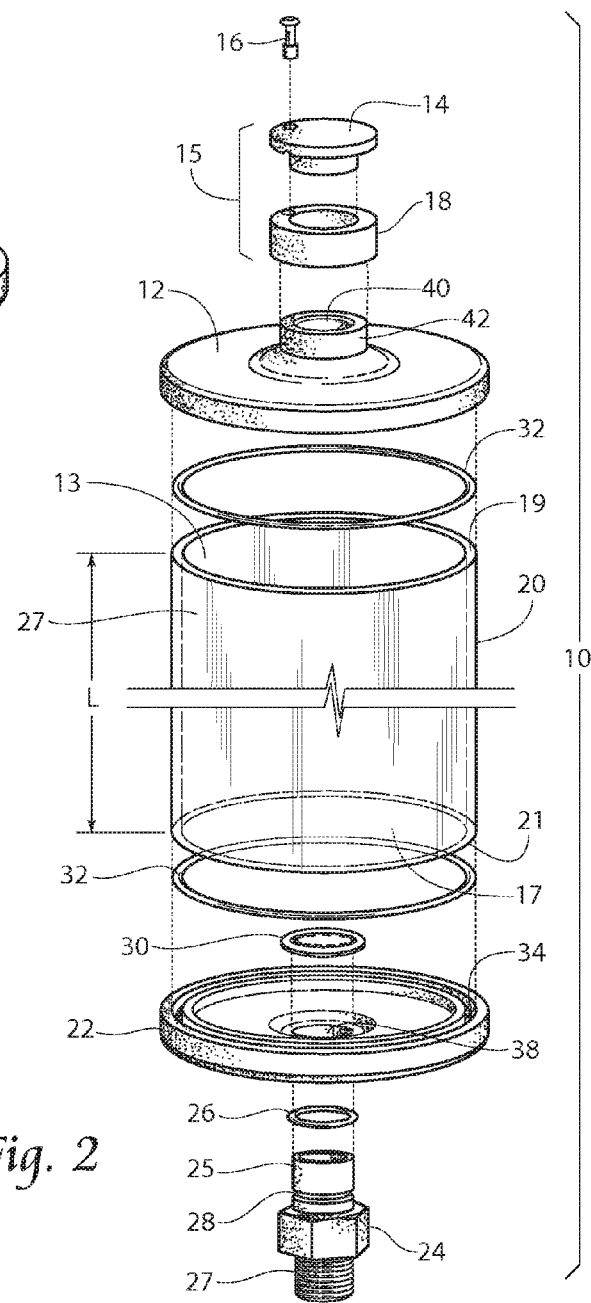
FIG. 2 is an exploded view of a first embodiment of the reservoir.

Referring now to FIG. 1, the general arrangement of one representative embodiment of a reservoir 10 is shown. The arrangement includes a cylindrical body 20 situated between a first molded end plate 12 and a second molded end plate 22. With the exception of openings for an inlet, outlet and/or level switch and/or indicia formed in or on the end plates 12 and 22, the first end plate 12 and second end plate 22 are substantially identical. The cylindrical body 20 may be fabricated from plastic, such as acrylic or from glass, such as PYREX® brand glass or from any other suitable material. Now referring to FIG. 2, the body 20 has at least one wall 27 that defines a cavity having open first and second ends 13 and 17, respectively. The wall 27 further has opposite wall edges 19 and 21. While shown to be cylindrical in the Figures, the body 20 can have any geometric cross section, shape or configuration. By way of example only, the body may be cubical as opposed to cylindrical as shown. The first end plate 12 has an inlet assembly 15 secured thereto in a fluid tight configuration at a central portion 42 of the end plate 12 as shown in FIGS. 1 and 2. The second end plate 22 has an outlet member 24 secured thereto, preferably in an opening 38 formed in a central portion of the end plate 22. The openings 38 and 40 for the respective inlets and outlet may be formed when the end plates 12, 22 are molded (as shown in the Figures) or may be formed, for example by machining after the molding process is complete. End plates 12 and 22 are molded from plastic resin such as polycarbonate. Alternatively, the resin may be polyurethane, polypropylene, or any other material conducive to the application of the reservoir 10. Preferably, the material selected for end plates 12 and 22 is chemically resistant. Also depending upon the application, the plastic resin may contain a predetermined amount of reground material.

As best shown in the exploded view of FIG. 2, the inlet assembly 15 includes an inlet cap or lid 14 connected to an inlet cap body 18 by an inlet cap tether or pin 16. The inlet assembly 15 allows for the inlet cap or lid 14 to be pivoted or picked up and rotated approximately 180 degrees out of the way about the inlet cap body 18 for filling of the reservoir 10 with a fluid (not shown). This configuration exposes the full opening for filling and does not require the operator to hold the cap 14 during filling. The inlet cap 14 furthermore remains attached to the inlet cap body 18 by the inlet cap tether or pin 16. In addition, the fill cap or lid 14 provides venting of the reservoir 10. It is to be understood that this is just an example of one type of suitable inlet assembly 15. Other types of inlet assemblies that allow for ease of filling and venting may be used as well. Preferably, inlet assembly 15 is affixed to end plate 12 at its central portion 42 in a fluid tight configuration.

Referring again to FIG. 2, the first end plate 12 and second end plate 22 are affixed and sealed to the cylindrical body 20 in a fluid tight configuration with an adhesive 32. After the adhesive is applied to either the first wall edge 19 or groove 36 or to both (see FIG. 3), the first end 13 of the cylindrical body 20 is placed inside the first end plate circumferential groove 36 and the adhesive 32 secures and seals this juncture. Similarly, the second edge 21 of the cylindrical body 20 is placed in the second end plate circumferential groove 34 which is similarly secured and sealed by the adhesive 32 to the cylindrical body 20. The fluid tight and sealed configuration of the first end plate groove 36, in which the first end 19 of the cylindrical body 20 seals and the second end plate groove 32 are best shown in the sectional view of FIG. 3. A two-part adhesive, such as Resinlab AR4305HP acrylic adhesive is preferable. After the two-part adhesive is applied, the reservoir may be placed in a fixture or jig to hold the end plates 12 and 22 securely to the cylindrical body 20 until the adhesive 32 has appropriately cured. This takes approximately 10 to 15 minutes. A one-part adhesive may also be used. For use on polypropylene end plates 12 and/or 22, Scotch Weld DP 8005 adhesive is preferred.

Additionally, the adhesive 32 may be an adhesive that is curable by ultraviolet light. This aids in the manufacturing process. The benefits of using this adhesive are many. It allows for proper positioning of the parts before curing, and once the parts are known to be in place and the UV light is applied, the curing time is minimal. This promotes both consistency and efficiency, which will eliminate waste and reduce cost. Other one-part and two-part adhesives may also be used because they, too, provide a consistent adhesive application. Any adhesives, however, may be substituted with other types of sealing compounds depending on the requirements, contents and/or specifications of the reservoir application.

Furthermore, the use of adhesive 32 to attach the end plates 12 and 22 allows for the production of reservoirs 10 of various sizes or capacities without having to construct a multitude of different parts or have a multitude of different molds. The variety of reservoir capacities is almost limitless because any length L (see FIG. 2) of body height, within reason, may be chosen. In the preferred embodiment the cylindrical body 20 is acrylic; however, glass or another suitable material may be used.

Moreover, the end plates 12 and 22 may be modified or customized for different applications. For instance, notification may be important for quickly identifying the type of fluid being housed within a reservoir 10 or the capacity of a reservoir 10. If desired, the end plates 12 and 22 may be engraved, colored, or otherwise designated for whatever the application requires. This can be done at the time the end plates 12 and 22 are molded or afterward. For example, one or both end plates 12 and 22 may be molded in a predetermined color. Alternatively or additionally, indicia may be formed in or applied to at least one of the end plates 12 and 22 during the molding process or afterward by engraving on the end plate 12 and/or 22. In our preferred embodiment, the end plates 12 and 22 are molded of a chemical resistant resin.

Additionally, in the present embodiment 10, the cylindrical body 20 and the affixed end plates 12 and 22 may be capable of rotating relative to the orientation of the outlet member 24. Outlet member 24 includes a threaded portion 27 and it will appreciated that once threaded portion 27 is tightened into a mating fitting (not shown), it may be desirable to rotationally adjust the reservoir 10. This may be desired where indicia or other markings (not shown) on the cylindrical body 20 or the end plates 12 and 22 is difficult to see after the reservoir 10 is installed on a machine, tool or air line. This may also be desired to obtain the correct orientation of the fill cap assembly 15, especially the "open" or filling position of fill cap or lid 14 relative to outlet member 24. Referring again to FIGS. 2 and 3, this may be achieved by inserting the first end 25 of the outlet member 24 into the second end plate 22 opening 38 and placing an internal tooth lock washer 30, or similar device, over the first end 25 providing for a secure connection but allowing for rotation. It is important to note that no threaded fastener is required. Fluid is prevented from leaking out of the second end plate opening 38 by a seal such as an o-ring 26 located on the seal groove 28 of the outlet member 24. As will be apparent to those skilled in the art, there are other configurations that may be employed for attaching outlet member 24 to end plate 22; those configurations fall within the scope of the present invention as well.

Figure 3:
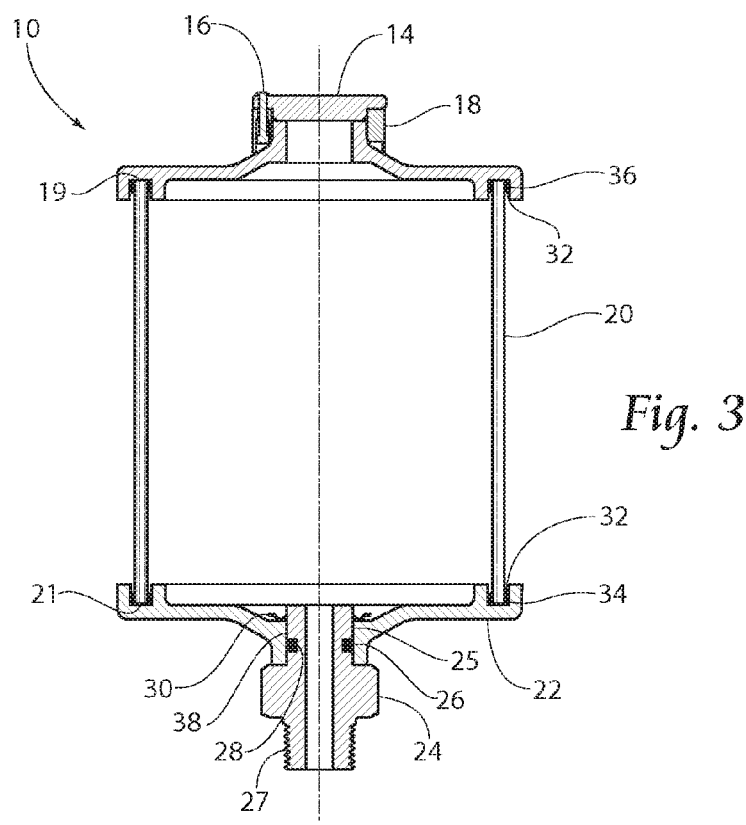
FIG. 3 is a front sectional view of a first embodiment of the reservoir along line 3-3 of FIG. 1.

As best seen in FIGS. 1 and 3, the outlet fitting 24 is preferably attached to end plate 22 such that minimal residual fluid remains in reservoir 10 when the reservoir is emptied through the opening 38. Furthermore, it will be appreciated that the outlet fitting 24 can accept various sized threaded fittings as required for any specific application.

Figure 4:
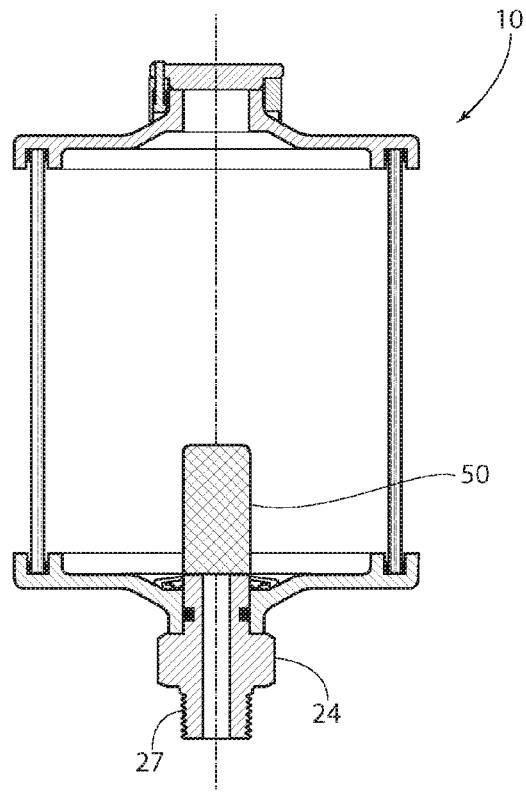
FIG. 4 is a front sectional view of a first embodiment of the reservoir with a filter.

FIG. 4 shows an embodiment of the reservoir 10 with a filter 50 as part of, or affixed to, the outlet member 24. This filter 50 prohibits unwanted particles or impurities (not shown) in the fluid within the reservoir 10 from exiting the reservoir.

Figure 5:
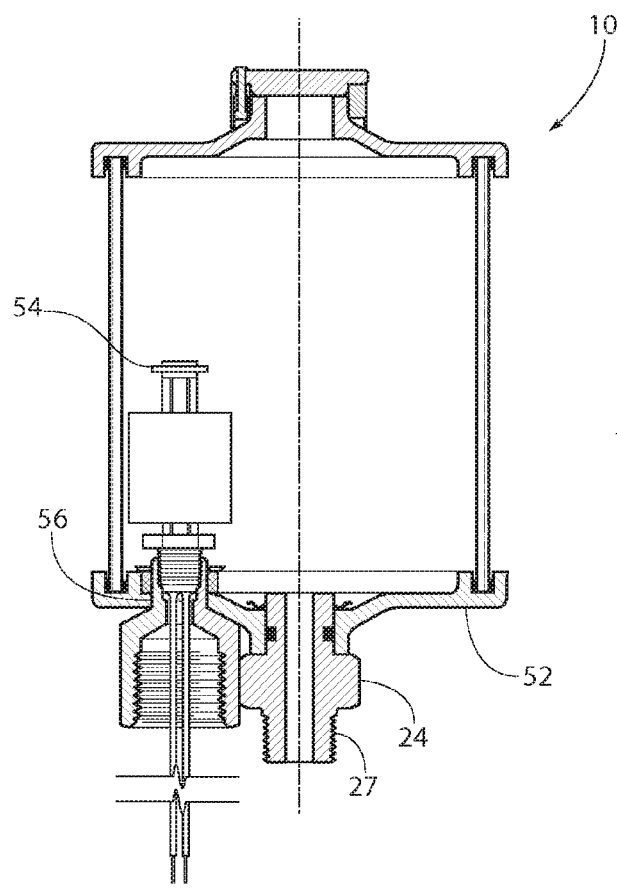
FIG. 5 is a front sectional view of a first embodiment of the reservoir with a low level switch.

FIG. 5 shows an embodiment of the reservoir 10 with a low level switch 54. The low level switch 54 may be used to indicate a low fluid level in the reservoir 10. In the embodiment shown, an alternate lower end plate 52 with low level switch adaptability is used in order to accommodate the low level switch 54. To accommodate a low level switch 54, a suitable second opening 56 is formed in the molded end plate 52. Opening 56 may be molded or formed (machined) after the molding process is complete. The switch 54 may be retained by any conventional means, including the use of an internal lock tooth washer as described above. In addition, the low level switch 54 may be rotated in the end plate 52 for proper orientation of a conduit fitting.

Figure 6:
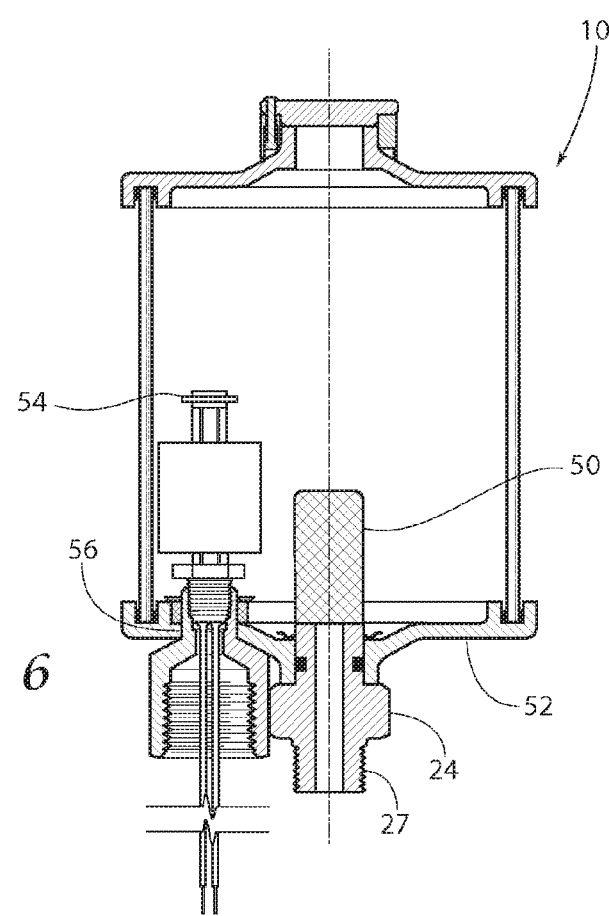
FIG. 6 is a front sectional view of a first embodiment of the reservoir with a filter and a low level switch.

FIG. 6 shows an embodiment of the reservoir 10 with both a filter 50 and a low level switch 54. This embodiment is a combination of the embodiments shown in FIGS. 4 and 5.

FIGS. 7 and 8 show an embodiment of the reservoir, 60, including an alternate outlet assembly 62 including a universal outlet fitting 64. Universal outlet fitting 64 has a standard sized threaded outlet diameter 70 that can be coupled to a multitude of additional fittings such as couplers, nipples, pipes, conduits, site gages, manifolds, etc. As in the previously described embodiment 10, the cylindrical body 20 and the affixed end plates 12 and 22 in conjunction with universal fitting 64 may be capable of rotating relative to the orientation of the outlet assembly 62. This may be desired where indicia or other markings (not shown) on the cylindrical body 20 or the end plates 12 and 22 is difficult to see after the reservoir 60 is installed on a machine, tool or air line. This may also be desired to obtain the correct orientation of the fill cap assembly 15, especially the "open" or filling position of fill cap or lid 14 relative to outlet member 24. Referring to FIGS. 7 and 8, this may be achieved by inserting the first end 65 of the universal outlet fitting 64 into the second end plate 22 opening 38 and placing an internal tooth lock washer 30, or similar device, over the first end 65 providing for a secure connection but allowing for rotation. Again, it is important to note that no threaded fastener is required. Fluid is prevented from leaking out of the second end plate opening 38 by a seal such as an o-ring 66 located on the seal groove 68 of the universal outlet fitting 64. The end user of the reservoir 10 can interchange any required fitting to mate with the universal outlet fitting 64. Universal outlet fitting 64 has a standard internally threaded opening 70. A second fitting, such as fitting 72, may be threaded into opening 70 as shown in FIG. 8. While the external threads and diameter 74 on fitting 72 match those of internal threads and diameter 70 of universal outlet fitting 64, it will be appreciated that external threads and diameter 76 may be the same or be any different size as required by the reservoir 60 application. As such, all reservoirs 60 can be fabricated with universal outlet fitting 64 and a fitting 72 may be installed after fabrication by either the manufacturer or the customer (end user) as required for the specific application. A fourth feature or benefit of the universal outlet fitting 64 is applicable to reservoirs 10 with level switches, such as the level switches 54 shown in FIGS. 5 and 6. The universal outlet fitting 64 allows different orientations of reservoir 10 relative to the location and/or position of the level switch 54.

Figure 9:
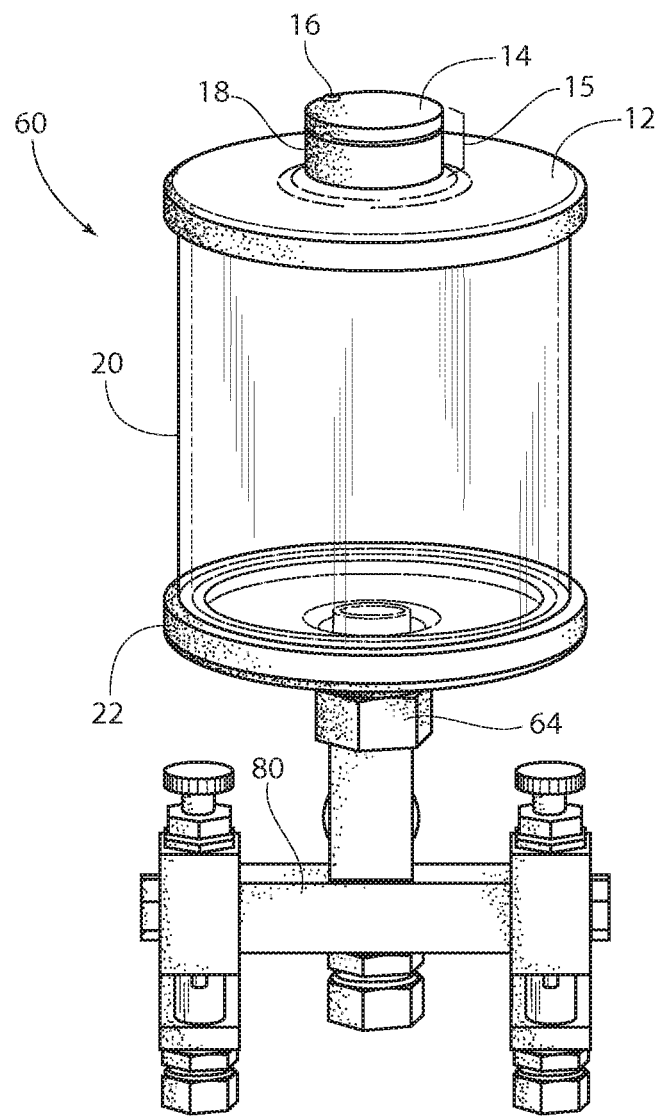
FIG. 9 is a perspective view of a second embodiment of the reservoir.

One of the universal outlet fitting features is illustrated in FIG. 9 where a dual flow control valve with sights and vents 80 is shown connected to universal outlet fitting 64. It is to be appreciated that any number of other fittings and conduit configurations can be attached or coupled to universal outlet fitting 64. As will again be apparent to those skilled in the art, there are also other configurations that may be employed for attaching universal outlet fitting 64 to end plate 22; all of these configurations fall within the scope of the present invention as well.

As shown in FIGS. 7, 8 and 9, the universal outlet fitting 64, including first (unthreaded) end 65 is preferably attached to end plate 22 such that minimal residual fluid remains in reservoir 10 when the reservoir is emptied through the opening 38.

The foregoing is considered as illustrative only of the principles of the invention. Furthermore, since numerous modifications and changes will readily occur to those skilled in the art, it is not desired to limit the invention to the exact construction and operation shown and described. While certain embodiments have been described, the details may be changed without departing from the invention, which is defined by the claims.

I claim:

1. A fluid retaining reservoir comprising:
   a body with a wall defining a cavity and having a first open end opposite a second open end;
   the wall has a first edge at the first open end, a second edge at the second open end, an inside surface, and an outside surface;
   a first molded end plate with a circumferential groove therein, the circumferential groove complementary in shape to, and configured to receive, the first edge of the wall;
   the first molded end plate having an inlet;
   an inlet assembly attached to the inlet, the inlet assembly comprising an inlet cap body and a cap pivotably coupled to the body by and about a pin, wherein the cap is configured to be pivotable with respect to the inlet of the first end plate to provide selectivity of access to the reservoir and a fluid-tight configuration;
   a second molded end plate with a circumferential groove therein, the circumferential groove complementary in shape to, and configured to receive, the second edge of the wall;
   the second molded end plate having an outlet and an outlet fitting coupled to the outlet, whereby the outlet fitting is arranged to allow rotation of the reservoir with respect to the outlet fitting and minimal residual fluid remains in the fluid retaining reservoir when the reservoir is emptied through the outlet;
   an adhesive predominately located within the circumferential grooves of the first molded end plate and the second molded end plate;
   wherein the adhesive is in contact with the first edge of the wall and the portion of the inside surface and the outside surface of the wall received within the circumferential groove of the first molded end plate and in contact with the second edge of the wall and the portion of the inside surface and the outside surface of the wall received within the circumferential groove of the second molded end plate; and wherein the adhesive maintains a fluid-tight connection of the first end plate to the first open end of the body and the second end plate to the second open end of the body.

2. The reservoir of claim 1 wherein the first end plate and the second end plate are molded from a plastic resin.

3. The reservoir of claim 2 wherein the first end plate and the second end plate resin is polycarbonate.

4. The reservoir of claim 2 wherein the first end plate and the second end plate resin is polypropylene.

5. The reservoir of claim 1 wherein the body is acrylic.

6. The reservoir of claim 1 wherein the body is glass.

7. The reservoir of claim 1 wherein the adhesive is a one-part adhesive.

8. The reservoir of claim 1 wherein the adhesive is a two-part adhesive.

9. The reservoir of claim 1 wherein the adhesive is an ultraviolet light curable adhesive.

10. The reservoir of claim 1 wherein a filter is affixed to the outlet of the second end plate.

11. The reservoir of claim 1 wherein a low level switch is located inside of the reservoir.

12. The reservoir of claim 1 wherein the outlet fitting is a universal fitting.

13. A reservoir comprising:
a body with a wall defining a cavity and having a first open end opposite a second open end; and
the wall has a first edge at the first open end, a second edge at the second open end, an inside surface, and an outside surface;
a first molded end plate with a circumferential groove therein, the circumferential groove complementary in shape, and configured to receive, the first edge of the wall;
an inlet being formed in the first molded end plate;
an inlet assembly attached to the inlet, the inlet assembly comprising an inlet cap body and a cap pivotably coupled to the body by and about a pin, wherein the cap is configured to be pivotable with respect to the inlet of the first end plate to provide selectivity of access to the reservoir and a fluid-tight configuration;
a second molded end plate with an outlet and a circumferential groove therein, the circumferential groove complimentary in shape, and configured to receive, the second edge of the wall;
an outlet fitting coupled to the outlet of the second molded end plate, whereby the outlet fitting is arranged to allow rotation of the reservoir with respect to the outlet fitting and minimal residual fluid remains in the fluid retaining reservoir when the reservoir is emptied through the outlet;
an adhesive predominately located within the circumferential grooves of the first molded end plate and the second molded end plate;
the wall first open end and the wall second open end received within the circumferential grooves of the first molded end plate and the second molded end plate, respectively;
the body sealingly attached to the first molded end plate with the adhesive in contact with the first edge of the wall and the portion of the inside surface and the outside surface of the wall received within the circumferential groove of the first molded end plate; and
the body sealingly attached to the second molded end plate with the adhesive in contact with the second edge of the wall and the portion of the inside surface and the outside surface of the wall received within the circumferential groove of the second molded end plate.

14. The reservoir of claim 13 wherein the first end plate and the second end plate are molded from a plastic resin.

15. The reservoir of claim 14 wherein the first end plate and the second end plate resin is polycarbonate.

16. The reservoir of claim 14 wherein the first end plate and the second end plate resin is polypropylene.

17. The reservoir of claim 14 wherein the body is acrylic.

18. The reservoir of claim 13 wherein the body is glass.

19. The reservoir of claim 13 wherein the adhesive is a one-part adhesive.

20. The reservoir of claim 13 wherein the adhesive is a two-part adhesive.

21. The reservoir of claim 13 wherein the adhesive is an ultraviolet light curable adhesive.

22. The reservoir of claim 13 wherein a filter is affixed to the outlet of the second end plate.

23. The reservoir of claim 13 wherein a low level switch is located inside of the reservoir.

24. The reservoir of claim 13 wherein the outlet fitting is a universal fitting.

* * * * *